(12) United States Patent
Li et al.

(10) Patent No.: US 7,379,627 B2
(45) Date of Patent: May 27, 2008

(54) INTEGRATED SOLUTION TO DIGITAL IMAGE SIMILARITY SEARCHING

(75) Inventors: Mingjing Li, Beijing (CN); Lei Zhang, Beijing (CN); Yanfeng Sun, Beijing (CN); Hong-Jiang Zhang, Beijing (CN); David R. Parlin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 865 days.

(21) Appl. No.: 10/689,106

(22) Filed: Oct. 20, 2003

(65) Prior Publication Data
US 2005/0084154 A1 Apr. 21, 2005

(51) Int. Cl.
G06K 9/54 (2006.01)
G06K 9/60 (2006.01)
G06F 17/00 (2006.01)
G06F 7/00 (2006.01)

(52) U.S. Cl. .................................. 382/305; 707/104.1
(58) Field of Classification Search ................ 382/190, 382/218–222, 305; 707/104.1
See application file for complete search history.

(56) References Cited

U.S. PATENT DOCUMENTS 6,246,790 B1* 6/2001 Huang et al. ............... 382/162
6,957,387 B2* 10/2005 Barbieri ..................... 715/719
7,233,708 B2* 6/2007 Li et al. ..................... 382/305
2003/0065661 A1* 4/2003 Chang et al. .................. 707/5
2003/0093437 A1* 5/2003 Gargi et al. ............. 707/104.1

OTHER PUBLICATIONS

Benchmarking of image features for content based retrieval, by Ma et al., IEEE 0-7803-5148-7/98, pp. 253-257.*
Yu, et al.; "Color Texture Moments For Content-Based Image Retrieval"; Microsoft Research Asia; 4 pages.
Stricker, et al.; "Similarity of Color Images"; SPIE 95, San Jose; pp. 1-12.
Huang, et al.; "Image Indexing Using Color Correlograms"; Cornell University; pp. 1-7.
Zhang, et al; "Boosting Image Orientation Detection with Indoor vs. Outdoor Classification"; 5 pages.
Manjunath, et al; "Texture Features for Browsing and Retrieval of Image Data"; IEEE Transactions on Pattern Analysis and Machine Intelligence; vol. 18, No. 8; Aug. 1996; 6 pages.
Harlick; "Statistical and Structural Approaches to Texture"; Proceedings of the IEEE, vol. 67, No. 5, May 1979; pp. 786-804.

* cited by examiner

Primary Examiner—Aaron W Carter
(74) Attorney, Agent, or Firm—Lee & Hayes, PLLC

(57) ABSTRACT

A process for comparing two digital images is described. The process includes comparing texture moment data for the two images to provide a similarity index, combining the similarity index with other data to provide a similarity value and determining that the two images match when the similarity value exceeds a first threshold value.

33 Claims, 7 Drawing Sheets

Fig. 4

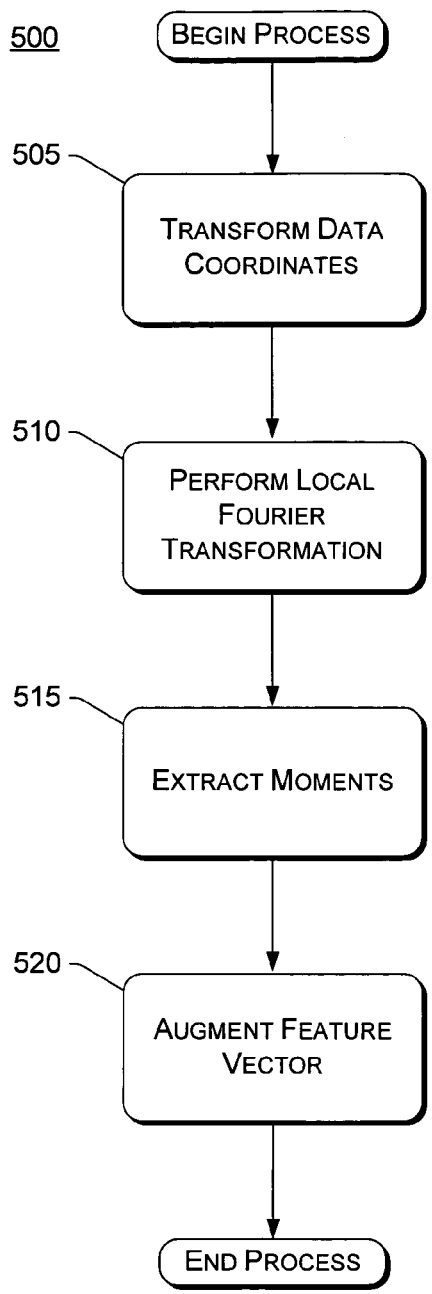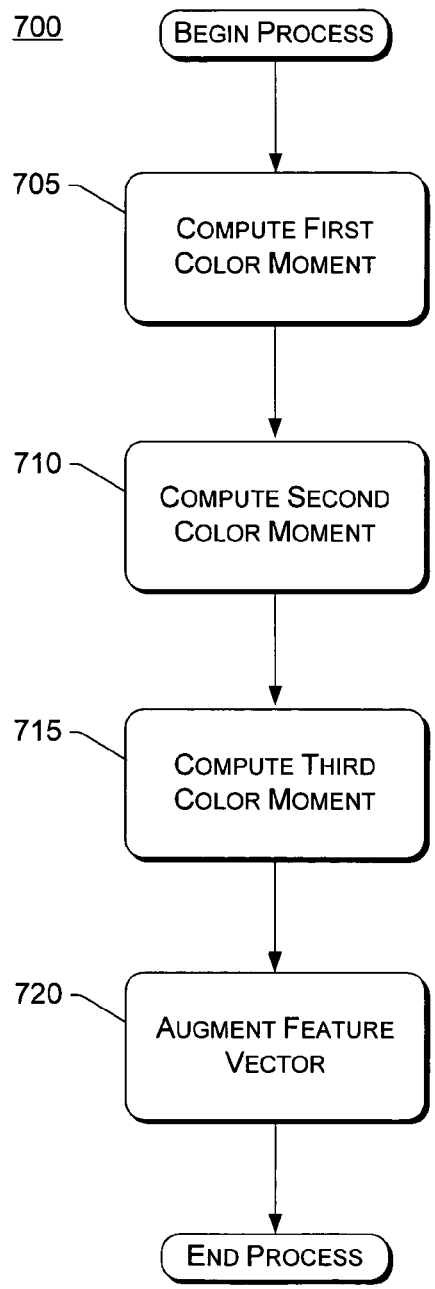
Fig. 5
Fig. 7

INTEGRATED SOLUTION TO DIGITAL IMAGE SIMILARITY SEARCHING

TECHNICAL FIELD

This disclosure relates to identification of digital images having similarities to one or more images belonging to a group of digital images.

BACKGROUND

People have engaged in production of images representative of subjects deemed memorable by their perceivers for millenia, using a variety of progressively less labor intensive techniques and resulting in renditions capable of increasingly more detailed depictions of the subjects. As a result of the reduction in labor intensity, larger numbers of renditions tend to be produced for any given subject of interest to the perceiver.

With film photographic or paper imaging techniques, a relatively small number of images result from any one session in which such images are produced. Accordingly, sorting techniques relying on manual effort are sufficient for most purposes to identify similar images from a collection of images.

However, in some situations, comparisons of images to identify those having similarity to a given exemplary image or set of query characteristics can require intense or prolonged effort when performed using manual techniques. Examples of such comparisons include sorting of fingerprint and photograph images spanning a relatively large geopolitical area or a relatively large population to find a match to a specific image or set of characteristics.

Development of digital techniques for storing and comparing data can facilitate sorting of a large collection of data, for example by use of keywords to sort textual databases, to find matches to specific characteristics or datasets. However, this technology has also led to evolution of increasingly large databases, exacerbating the difficulties involved in selection or matching of bodies of data to locate those having specific characteristics.

One approach to sorting images to find those exemplifying particular characteristics involves associating each image with one or more keywords and then storing the keywords in a database together with at least information identifying the image associated with the keywords. Sorting of textual databases or groups to select examples associated with a particular Hollerith string, key word or keywords or textual content can yield matches having desired characteristics but this approach also has limitations.

Image sorting tasks include need to be able to account for differences in scale or perspective, rotation, translation, inclusion of a desired set of information within a larger body of data and other aspects not generally involved in textual data searching tasks. As a result, techniques have been developed to extract content-based information from digital images and to employ the content-based information in order to be able to search for specific characteristics, which may be exemplified by a sample image.

Typically, bodies of data representing images are constructed by indexing each image to generate a feature vector capturing some key properties of the image and then storing the resultant feature vector in a database or feature-base. A sample feature vector or "query" vector, which may result from indexing a sample image, is then compared to the stored feature vectors to identify those stored feature vectors most likely to correspond to images similar to a desired image. The feature vectors may be augmented using one or more keywords, as described above, to provide capability for low-level feature matching using the feature vectors coupled with matching of a limited amount of higher-level data in the form of keywords.

Feature-vector based image recognition algorithms need to meet conflicting criteria. A difference, such as a normalized scalar corresponding to subtraction of the sample or query feature vector and one of the stored feature vectors, should be large if and only if the images are not "similar". The feature vectors should lend themselves to rapid formulation from an image. Smaller size of the feature vectors themselves can increase computational "efficiency" and decrease need for data storage capacity. Such efficiency may be manifested by facilitating rapid manipulation of the feature vectors. As a result, the types of feature vectors most frequently employed to date are based on relatively low-level features, in part to restrict the size of the resultant feature vectors and data bodies, and thus such feature vectors capture only some aspects of the image content.

Unfortunately, low-level information, such as that employed by such digital image search algorithms presently available, often does not provide a good match to human perceptions of the images. As a result, matching procedures based on these kinds of low-level data often do not provide satisfactory results. They may result, for example, in a relatively large number of false positives, particularly with large databases, or they may not manifest robust matching in view of appearance changes between images of a common subject (e.g., modified viewpoints from which otherwise similar images are generated). Additionally, some of the image sorting techniques developed to date require considerable user sophistication in order to employ them and to interpret the results.

The development of digital photography and increasingly user-friendly digital cameras and scanners capable of digitizing images permits a larger portion of the public to participate in digital image manipulation. Wider availability and distribution of increasingly powerful microprocessors facilitates sorting of digital images by automated apparatus, such as by a personal computer, even by persons having little or no formal training in computer techniques.

An exemplary product providing, among other things, a capability for sorting of digital images, is known as the "Adobe Photoshop Album", available at www.adobe.com/products/photoshopalbum/main.html from Adobe Systems Incorporated, 345 Park Avenue, San Jose, Calif. A review of this product, entitled Adobe Photoshop Album Review, is available at www.dpreview.com/reviews/products/adobe-photoshopalbum/page2.

The sorting performed by this product is based on a color similarity search across a given body of images using one or more user-provided sample images employed to form a query. However, color similarity is only one limited measure of match between images. Simple examples where color similarity would be expected to fail include comparison of a colored image to a sepia image or a gray scale image of highly similar subject matter.

Much research has been devoted to rendering digital photography user-friendly and to enable those having relatively little training or sophistication to provide and manipulate high quality images. However, improved automatic image sorting and matching continues to be desirable, particularly for photographic instruments intended to foster broad market acceptance across a user base reflecting different degrees of user sophistication.

SUMMARY

In one aspect, the present disclosure describes a process for comparing two digital images. The process includes comparing texture moment data for the two images to provide a similarity index, combining the similarity index with other data to provide a similarity value and determining that the two images match when the similarity value exceeds a first threshold value.

BRIEF DESCRIPTION OF THE CONTENTS

FIG. 4 depicts eight templates useful for extracting color texture moment data from a digital image composed of portions analogous to the portion of FIG. 3

FIG. 5 is a flowchart describing a process for extraction of texture moment data from an image.

FIG. 7 is a flowchart describing a process for computing moments of color data.

DETAILED DESCRIPTION

The following disclosure describes digital image data processing and storage techniques useful in the context of building databases of digital images and in rapidly and accurately sorting feature vector information associated with digital image data stored in such databases to match a query such as one or more selected digital images or a set of image characteristics to one or more digital images corresponding to stored data. These techniques rely on multiple characteristics extracted from digital images to aid in classification and retrieval. The ability to efficiently discriminate between similar and dissimilar image characteristics enables even a relatively unsophisticated user to efficiently locate a match to a set of query data, which may be extracted from one or more query images, or to determine that no match is contained in the database.

Introduction

Prior to describing how an improved image matching technology discriminates between similar and dissimilar image data, the following section addresses an environment in which such technology finds utility. The discussion of the environment provides a framework within which various elements of the improved image sorting and matching technology can be developed.

Environment

Figure 1:
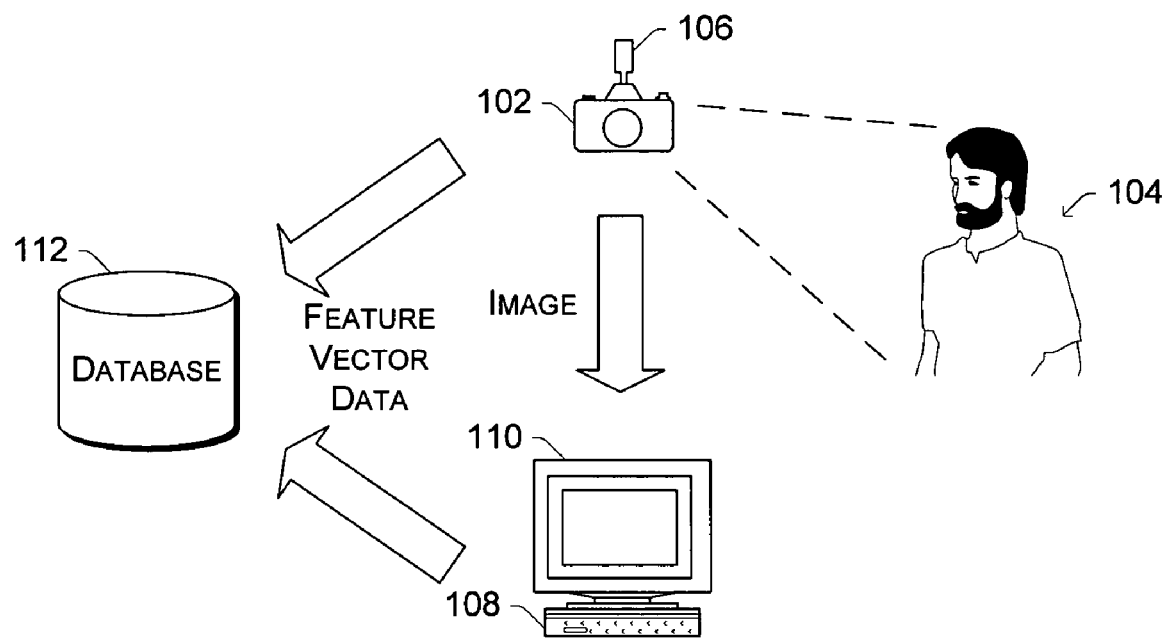
FIG. 1 illustrates an exemplary environment suitable for digital photography.

FIG. 1 illustrates an exemplary environment suitable for digital photography. A camera 102 is used to take one or more pictures of a subject 104. When pictures are taken in lower ambient light settings, they are often taken using a flash 106 on the camera 102. These images captured by the camera 102 may be analyzed to identify various image characteristics and to automatically extract corresponding information. The information can be used to form a feature vector describing these characteristics and that thus characterizes the associated image. Feature vectors are useful in sorting data corresponding to multiple images to identify similar images, as discussed in more detail below. The analysis and feature vector formation may be performed in the camera 102, or alternatively the captured images may be transferred to a computing device 108, where analysis and feature vector formation may be effectuated. The computing device 108 may be any of a wide variety of devices, such as a desktop or portable computer, a remote computer or group of computers accessed via a network, and may include copying, scanning or printing devices (e.g., a photograph enlargement device including a scanner and printer), etc. The computing device 108 may include a display 110.

The feature vectors are stored in a memory such as a database 112. The database 112 is formed in any type of volatile or non-volatile memory, which may be contained in the camera 102, the computing device 108 or which may be external to either the camera 102 or the computing device 108.

The camera 102 may be any type of image capture device that captures and stores (or communicates) images, such as a film camera, a vacuum-tube-based camera, a digital camera, a video camera, a camcorder etc. The camera 102 may capture images in any of a variety of conventional manners, such as exposing film on which the image is captured, exposing one or more charge coupled devices (CCDs) or CMOS imaging ICs and storing a captured still image in memory (e.g., a removable Flash memory, hard disk (or other magnetic or optical storage medium), or motion video tape), exposing one or more CCDs or CMOS imaging ICs and storing multiple captured frames (a captured video sequence) on a recording medium (e.g., Flash memory, floppy disk, hard drive, magnetic tape, compact disc etc.). Conventional printed images (film-based images, images from books, magazines, posters and the like) may be rendered into digital form by scanning or by photography using a digital camera, and images from video sources such as television signals and the like may also be converted to digital formats using conventional apparatus.

Feature Vector Formation Overview

Figures 2, 3:
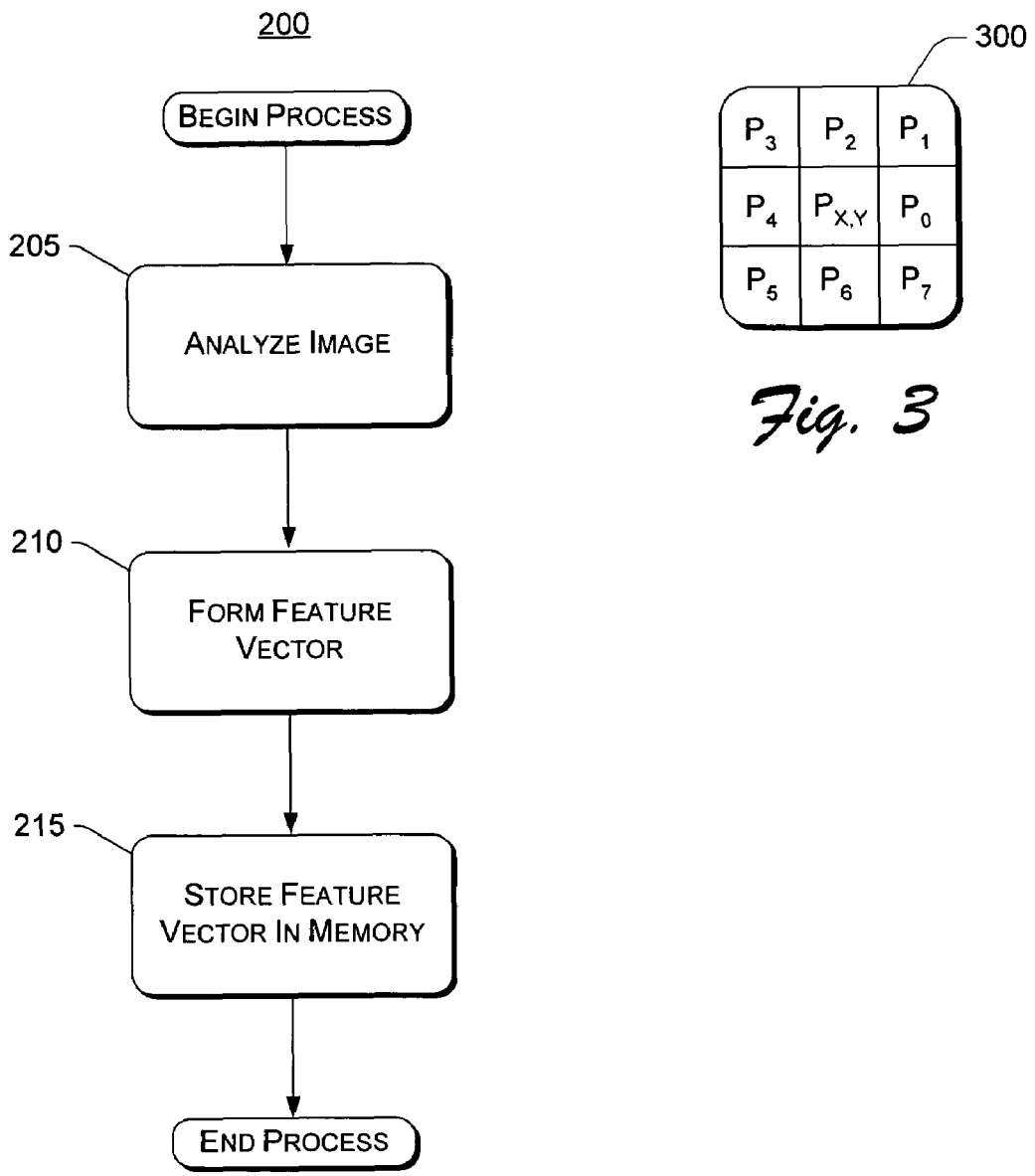
FIG. 2 is an exemplary flowchart describing an overview of a process for manipulating image characterization data from a digital image and for feature vector formation.
FIG. 3 illustrates an exemplary portion of a digitized image from a picture such as a picture taken in the environment of FIG. 1.

FIG. 2 is an exemplary flowchart describing an overview of a process 200 for manipulating image characterization data from a digital image and for feature vector formation. The process 200 begins in a block 205.

In the block 205, the process 200 indexes image characterization data. In one embodiment, the image characterization data is formed from a digital image by extracting low-level feature data corresponding to a plurality of low-level features from the digital image. In one embodiment, the plurality of low-level features includes two or more low-level features chosen from a group consisting of: color correlogram data; color moment data; and texture moment data.

In a block 210, the process 200 organizes the data into a feature vector. When color texture moment data (discussed in more detail with reference to FIGS. 3, 4 and 5, infra) are employed, that portion of the data may be represented by a 48 element vector component, e.g., by sixteen dimensions for each color channel. When color texture moment data are employed for a grey scale image, that portion of the data thus may be represented by a 16 element feature vector.

In a block 215, the process 200 stores the feature vector in an electronic memory, such as RAM or a database of feature vectors corresponding to a plurality of images. Storing the feature vector in a memory may comprise adding the feature vector to a database, such as the database 112 of FIG. 1, or may comprise storing the feature vector for purpose of comparison to other feature vectors to attempt to identify images corresponding to the feature vector. The process 200 then ends.

The block 205 incorporates a plurality of indexing algorithms operating in concert to provide increased robustness in image recognition. A number of different indexing algorithms are known, and each presents attributes in the image recognition process. At the same time, many have specific weaknesses that may be ameliorated by formulating the recognition process to benefit from respective areas of strength from more than one image recognition scheme.

For example, color indexing employs the observation that color is often related to the nature of the object or to functionality—road signs employ standardized color schemes, forests and plants tend to be green, many types of roads are black, clear daytime skies are blue etc. Two different color indexing approaches are described in "Similarity of Color Images", by M. Stricker and M. Orengo, Proc. SPIE on Storage and Retrieval for Image and Video Databases, Vol. 2420, pages 381-392, San Jose Calif., February 1995, which is hereby incorporated herein by reference. However, color information by itself does not determine identity—other types of information, such as texture and shape, are needed in order to be able to classify identity.

Color histograms also describe global color distribution in an image but do not include spatial information. Color histograms tend to be computationally convenient and provide results that are relatively insensitive to small changes in viewing position but that also tend to provide excess false positives, particularly when used in conjunction with large databases. Color histogram-based approaches may be augmented to include some spatial information using image partitioning by splitting the image into sub-regions and imposing positional constraints on the image comparison process. Another color histogram augmentation technique involves augmentation of histogram data with local spatial properties ("histogram refinement").

Other types of content-based information retrieval systems are directed towards indexing by extraction of texture features. These include Gabor wavelet feature-based approaches and MS-SAR. The former is described in "Texture Features For Browsing And Retrieval Of Image Data", by B. Smith and W. Ma, IEEE Transactions On PAMI, Vol. 18, No. 8, pp. 837-842, 1996, while the latter is described in "Texture Classification And Segmentation Using Multiresolution Simultaneous Autoregressive Models", by J. Mao and A. Jain, Pattern Recognition, Vol. 25, No. 2, pp. 173-188, 1992, which are hereby incorporated herein by reference.

Yet another approach involves splitting an image into a number of overlapping regions and extracting color information, such as the first three color moments, from each region to form a feature vector for the image. The overlapped portions tend to render this approach relatively robust to small translations or rotations.

Color coherent vector (CCV) algorithms and enhanced versions (e.g., CCV/C, infra) partition histogram bins by spatial correlation of pixels. A pixel is deemed "coherent" when it is part of a larger, similarly-colored region, and is deemed "incoherent" otherwise. A color coherence vector is the feature vector description of an image that corresponds to this classification scheme. This approach is computationally tractable and appears to improve image recognition properties vis-à-vis color histogram techniques. Use of the "center" group of pixels (e.g., the centermost 75% of the pixels) as an additional feature provides further improvement and is referred to as CCV with successive refinement or CCV/C.

Further improvement can be achieved using a correlogram approach, described in "Image Indexing Using Color Correlograms", by J. Huang et al., Proc. IEEE Comp. Sci. Conf. Comp. Vis. and Patt. Rec., pages 762-768, 1997 and/or a color texture moment approach, described in "Color Texture Moments For Content-Based Image Retrieval", H. Yu et al., published in Proc. IEEE Intl. Conf. on Image Processing, Sep. 22-25, 2002, which are hereby incorporated herein by reference. An embodiment of the color texture moment characterization mentioned hereinabove with reference to FIG. 2 is described below with reference to FIGS. 3, 4 and 5.

Color Texture Moment Model

Figure 4:
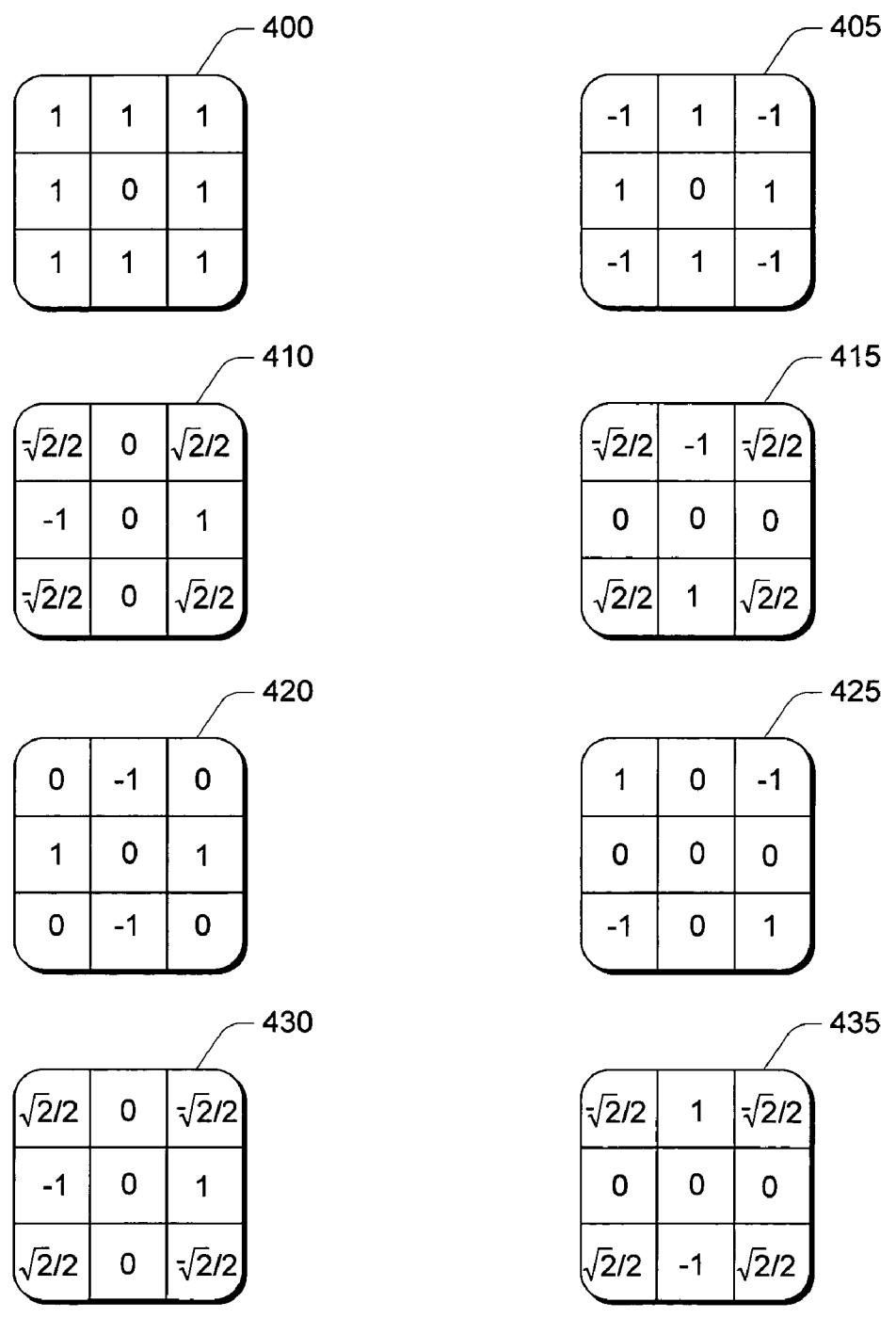

FIG. 3 depicts an exemplary portion 300 of a digitized image from a picture such as a picture taken in the environment 100 of FIG. 1, while FIG. 4 depicts eight templates 400, 405, 410, 415, 420, 425, 430 and 435 useful for extracting color texture moment data from a digital image composed of portions analogous to the portion 300 of FIG. 3 via an exemplary color texture extraction process 500 described below with reference to FIG. 5.

FIG. 3 illustrates the portion 300 as comprising a central pixel having coordinates (x, y), denoted $P_{X,Y}$, surrounded by eight nearest neighbor pixels, labeled $P_0$, $P_1$, $P_2$, $P_3$, $P_4$, $P_5$, $P_6$ and $P_7$, respectively. Texture in the composite image may be classified using a local Fourier transformation by successively operating on portions 300 of the image.

A basic issue for local Fourier transforms is to select a color space (e.g., perform a coordinate transformation of the image data, block 505, FIG. 5) related to image retrieval performance. Different color spaces for feature extraction will generate different results and will pose different challenges in the process. An exemplary color space promoting perceptual uniformity is known as "HSV color space" or "hue, saturation and value color space". The HSV color space is related to a conventional red-green-blue or RGB color space by a nonlinear transformation of a three-dimensional RGB space which may be denoted the RGB cube. HSV color space also is a conventional representation space used in modeling of color vision and color image processing. HSV values for a pixel can be found from RGB values for the pixel via Calcs. (1), (2) and (3) below.

$$H = \tan^{-1}((3)^{1/2}(G-B)/((R-G)+(R-B))) \qquad \text{Calc. (1)}$$

$$S = 1 - ((\min(R, G, B))/V \qquad \text{Calc. (2)}$$

$$V = (R+G+B)/3 \qquad \text{Calc. (3)}$$

One disadvantage of HSV space is labile values near zero saturation and a singularity at S=0. Another problem arises when the Fourier transform is applied to the hue channel, because hue is expressed as an angular coordinate represented as a scalar value. This implies high frequencies for only soft color changes between red and magenta. To overcome this, pixels may be represented in a modified HSV space by variables $x_1$, $x_2$ and $x_3$, which may be calculated from traditional HSV values for each pixel via Calcs. (4), (5) and (6) below:

$$x_1 = S*V*\cos(H) \qquad \text{Calc. (4)}$$

$$x_2 = S*V*\sin(H) \qquad \text{Calc. (5)}$$

$$x_3 = V \qquad \text{Calc. (6)}$$

Use of this coordinate arrangement allows the moments to be calculated independently from each of the eight maps (FIG. 4) for each of the color channels, and this allows relatively full utilization of the color information. In one implementation, this results in a 16 dimensional feature vector for each color channel. Concatenation of the feature vectors extracted for each color channel results in a 48 dimensional feature vector representative of both color and texture data in the image. This compares favorably to a color histogram quantization scheme employing 256 dimensional feature vectors, in that improved performance is possible using substantially smaller feature vectors. In one implementation, the feature is extracted from the V channel only, or in the case of grayscale images, where the resulting feature vector is 16 dimensional, the extracted feature is referred as texture moment in the rest of this document.

In a block 510, the image data are then processed to provide a local Fourier transformation of the image data for the portion 300 of FIG. 3. An L×M pixel image I(x, y) may be represented as $\{I(x, y)|x=0, \ldots, L-1, y=0, \ldots, M-1\}$. Assuming that the portion 300 can be treated as a periodic sequence with a period of 8, the portion 300 may be represented as $I(x, y, n)=P_n$, $0 \le n \le 7$. Other portions analogous to the portion 300 may be similarly modeled, with similar portions having similar series of I(x, y, n) and also having similar Fourier transform coefficients in the frequency domain. As a result, the local Fourier transform has utility in extraction of features representative of local greytone spatial dependency.

The local Fourier transform is equivalent to multiplication by eight unique templates 400, 405, 410, 415, 420, 425, 430 and 435 shown in FIG. 4 independently operating on the portion 300 to provide eight corresponding characteristic maps FI(k). The eight characteristic maps FI(k), representing co-occurence of grey levels and their distribution, correspond to Calcs. (7) and (8) below:

$$FI(k)=\{F(x,y,k)|x=0, \ldots, L-1, y=0, \ldots, M-1\}, \quad \text{Calc. (7)}$$

where $0 \le k \le 7$, and $$F(x, y, k) = (1/8) \sum_{n=0}^{7} I(x, y, n) \exp(-j\pi kn/4), \quad \text{Calc. (8)}$$

with exp(x) denoting $e^x$.

The eight templates 400, 405, 410, 415, 420, 425, 430 and 435 can be used to extract the local Fourier components directly. The Fourier components that the eight templates of FIG. 4 correspond to are given below in Table I.

TABLE I

Fourier components corresponding to templates.

| Template | Fourier component. |
|---|---|
| 400 | F(x, y, 0) |
| 405 | F(x, y, 4) |
| 410 | Re(F(x, y, 1)) |
| 415 | Im(F(x, y, 1)) |
| 420 | Re(F(x, y, 2)) |
| 425 | Im(F(x, y, 2)) |
| 430 | Re(F(x, y, 3)) |
| 435 | Im(F(x, y, 3)) |

The eight templates 400, 405, 410, 415, 420, 425, 430 and 435 of FIG. 4 are orthogonal to each other and complete. Therefore, these characteristic templates facilitate extraction of useful information characterizing the pixel distribution in the image.

A first texture moment $TM_1$ (average of the Fourier coefficients) and a second texture moment $TM_2$ (standard deviation) of the Fourier transformed data are then extracted in block 515 of FIG. 5 using standard techniques. It is known (W. Ma and H. Zhang, "Content-based Image Indexing And Retrieval", in Handbook Of Multimedia Computing, Borko Furht, Ed., CRC Press, 1998) that interpreting the color distribution associated with a characteristic map as a probability distribution uniquely characterizable by its moments provides a convenient tool for summarizing the information obtained using this process. As most of the color distribution information can be captured with the low-order moments, use of the first $TM_1$ and second $TM_2$ texture moments provides an effective and efficient representation of the color distribution information.

The first $TM_1$ and second $TM_2$ texture moments of each characteristic map FI(k) formed using the orthogonal templates 400, 405, 410, 415, 420, 425, 430 and 435 of FIG. 4 are analogously useful in representing the local Fourier transform data characterizing texture of the image portions 300 of FIG. 3. This provides a rough but robust representation of image quality in a compact and useful form.

In a block 520, a feature vector corresponding to the image being analyzed is then augmented with the first $TM_1$ (average) and second $TM_2$ (standard deviation) moments of the Fourier coefficients describing the image. Moments are discussed in more detail below with respect to the color moments model. The moments taken from the data provide one portion of a feature vector corresponding to the image. The process 500 then ends.

Color Correlogram Model

Figure 6:
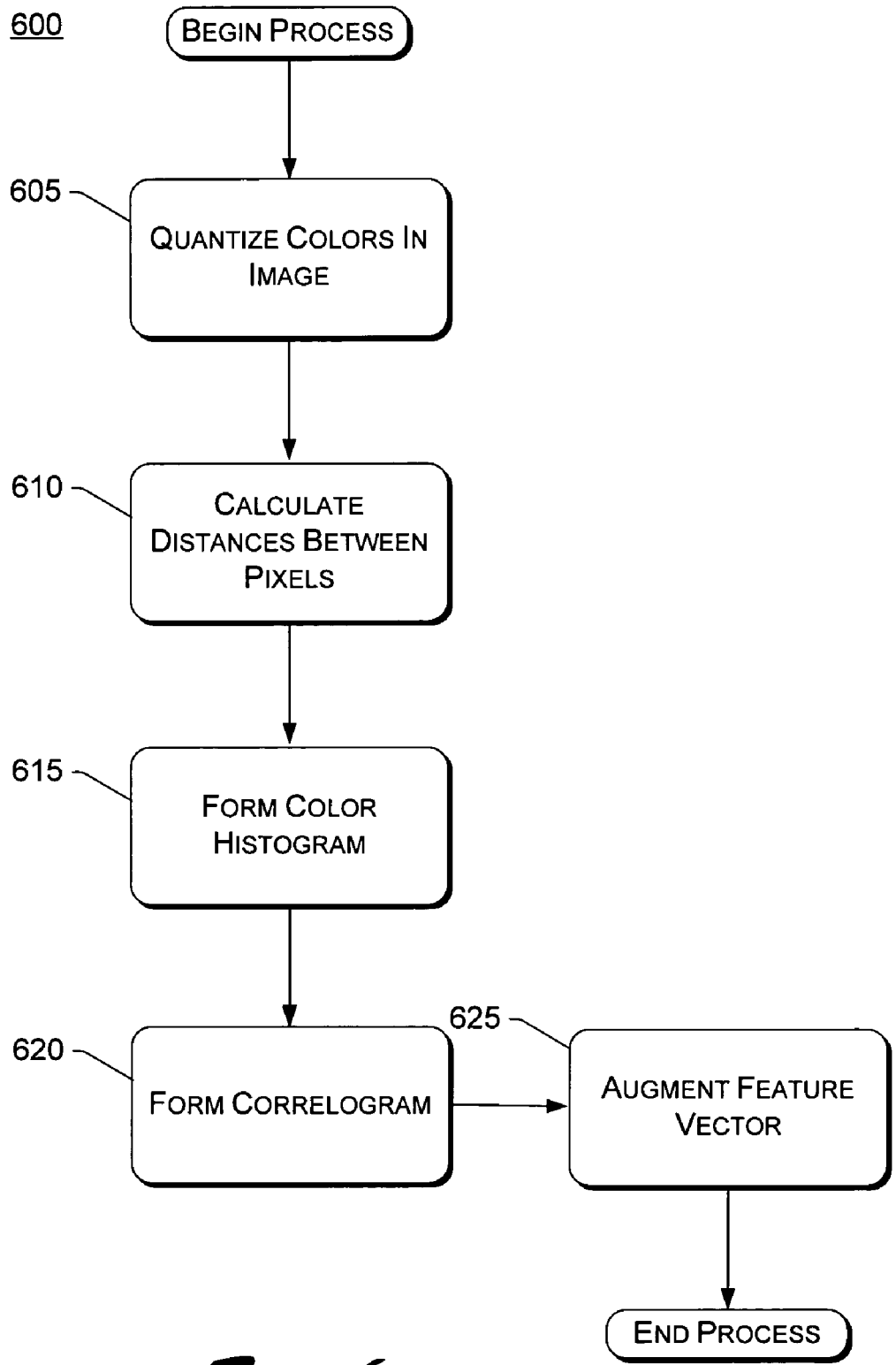
FIG. 6 is a flowchart describing a process for extraction of correlogram data from an image.

FIG. 6 is a flowchart describing a process 600 for extraction of correlogram data from an image. In contrast to color histograms, correlograms express how the spatial correlation of pairs of colors changes with distance of separation. Correlograms are discussed below for a square image region I of n×n pixels, with $\{1, 2, \ldots, n\}$ denoted [n]. For a pixel p(x, y)∈I, let I(p) denote the color of the pixel, where $I_c=\{p|I(p)=c\}$.

The process 600 begins in a block 605. In the block 605, the colors in the image I(x, y, n)=I are first quantized into m many colors $c_1, \ldots, c_m$. In a block 610, distances between pixels are calculated. A distance $d=|p_1-p_2|$ between two pixels $p_1=(x_1, y_1)$ and $p_2=(x_2, y_2)$ is defined as given in Calc. (9) below:

$$|p_1-p_2| \equiv \max\{|x_1-x_2|, |y_1-y_2|\}. \quad \text{Calc. (9)}$$

This relative distance measure has been empirically determined to provide better results in most applications than more conventional absolute component-wise differences between vectors.

In a block 615, a histogram h of colors c is computed. The histogram h of colors for the image I is defined for i∈[m] as shown in Calc. (10) below:

$$h_{c_i} \triangleq \Pr_{p \in I}[p I_{c_i}] \quad \text{Calc. (10)}$$

The histogram h corresponds to the probability Pr that a pixel p in the image I has the color $c_i$, as described in "Image Indexing Using Color Correlograms", by J. Huang et al. For any pixel in the image, $h_{c_i}(I)/n^2$ is the probability that the pixel has color $c_i$.

In a block 620, a correlogram $$\gamma^{(k)}_{c_i,c_j}$$

of the image is computed as described with reference to Calcs. (11) through (18) below. The correlogram $$\gamma^{(k)}_{c_i,c_j}$$

is a probability distribution, as is the histogram, but whereby, for any pixel of color $c_i$ in the image, the correlogram $$\gamma^{(k)}_{c_i,c_j}$$

gives the probability that a pixel at a distance k away from the pixel is of color $c_j$. For an a priori fixed distance $d\epsilon[n]$, the correlogram $$\gamma^{(k)}_{c_i,c_j}$$

of I is defined for i, j$\epsilon$[m], k$\epsilon$[d] as shown below in Calc. (11):

$$\gamma^{(k)}_{c_i,c_j} \triangleq \underset{p_1 \in I_{c_i}, p_2 \in I}{Pr}[p_2 \in I_{c_j} \mid |p_1 - p_2| = k] \qquad \text{Calc. (11)}$$

The size of the correlogram $$\gamma^{(k)}_{c_i,c_j}$$

is $O(m^2 d)$. The autocorrelogram $\alpha_c^{(k)}$ of I captures spatial correlation between identical colors c and is defined by Calc. (12) below:

$$\alpha_c^{(k)}(I) \triangleq \gamma_{c,c}^{(k)}(I). \qquad \text{Calc. (12)}$$

This subset of the correlogram requires only O(md) space.

The choice of the distance d is significant in terms of the number of calculations and the size of the resulting dataset, versus the quality of the resultant feature vector. A larger d results in increased computations and larger data storage requirements, while too small a choice for d will compromise the quality. However, larger datasets may be addressed using techniques described later below.

Counts $$\Gamma^{(k)}_{c_i,c_j}$$

may be calculated as described below, and are analogous to the co-occurrence matrix defined in R. Haralick, "Statistical And Structural Approaches To Texture" (Proc. of the IEEE, 67(5), pages 786-804, 1979), hereby incorporated herein by reference. The counts $$\Gamma^{(k)}_{c_i,c_j}$$

represent a count of all pixels $p_2 \epsilon I$ of color $c_j$ with $|p_1-p_2|=k$, for each $p_1 \epsilon I$ of color $c_i$ and for each k$\epsilon$[d] and is defined as shown below in Calcs. (13) and (14):

$$\Gamma^{(k)}_{c_i,c_j} \triangleq |\{p_1 \in I_{ci}, p_2 \in I_{cj} \mid |p_1 - p_2| = k\}|, \qquad \text{Calc. (13)}$$

where $$\gamma^{(k)}_{c,c}(I) = \Gamma^{(k)}_{c_i,c_j}(I) / (h_{c_i} * 8k), \qquad \text{Calc. (14)}$$

with the factor 8 k being due to the properties of the conventional $L_{-\infty}$ distance norm. The denominator of Calc. (14) represents the total number of pixels at distance k from any pixel $c_i$. Unfortunately, however, evaluation of Calcs. (13) and (14) requires $O(n^2 d^2)$.

For smaller d, counts λ of pixels p of a given color within a given distance from a fixed pixel in a positive horizontal or vertical direction can be obtained using Calcs. (15) and (16) below, respectively:

$$\lambda^{c,h}_{(x,y)}(k) \triangleq |\{(x+i, y) \in I_c \mid 0 \le i \le k\}| \qquad \text{Calc. (15)}$$

$$\lambda^{c,v}_{(x,y)}(k) \triangleq |\{(x, y+j) \in I_c \mid 0 \le j \le k\}|. \qquad \text{Calc. (16)}$$

When d is small, these calculations are of the order $O(n^2 d)$, however, when d approaches O(n), the calculations described above are of order $O(n^3 d^{\omega-2})$ where $\omega \epsilon[2, 3)$ and thus are sub-optimal. Algorithms for fast matrix multiplication may be used to reduce the computational burden. An alternative approach to computing these counts employs fast matrix multiplication. For $I_c$ an n x nd 0-1 matrix, with $I_c(p)=1 \Leftrightarrow I_c(p)=c$ and $N_1$ a matrix whose $(nk+y)^{TH}$ column y$\epsilon$[n], k$\epsilon$[d] is given by:

$$[0, \ldots, 0, \overset{y-1}{1}, \ldots, \overset{k}{0}, \ldots, 0]^T, \qquad \text{Calc. (17)}$$

and $$(I_c N_1)[x, nk+y] = \lambda^{c,h}_{(x,y)}(k) \qquad \text{Calc. (18)}$$

Using another nd x d matrix $N_2$ to accumulate $$\sum_{x=1}^{n} \lambda_{(x-k,y+k)}^{c,h}(2k)$$

from the product $I_cN_1$ for each distance k∈[d] and column y∈[n], forming the product $I_cN_1N_2$, and adding each column in this product, the result $\Sigma_{(x,y)\in I}\lambda_{(x-k,y+k)}^{c,h}$ (2k) is obtained. This is the first of three terms in the sum $$\Gamma_{c_i,c_j}^{(k)}(I).$$

The remaining terms are similarly calculated. This facilitates rapid calculation of counts when the distance over which pixels are counted is large and may be implemented using relatively fast hardware approaches to matrix multiplication.

In a block 625, the feature vector corresponding to the image is augmented with the correlogram information. The process 600 then ends.

The correlogram computations described above may be implemented using parallel processing. Additionally, partial correlograms may be employed using small d or a set of small distances D. This does not compromise the quality of the results excessively because local correlations between colors are more significant than global correlations in images, but does reduce the data storage requirements. Sparsity of the correlogram datasets may also be employed to reduce data storage requirements.

Additionally, a two-pass approach may be employed. A first pass through the database with a rapid but inefficient algorithm, but one which ensures that the initial set includes the desired images, allows a more sophisticated matching algorithm to operate on a reduced number of images in a second pass to provide the desired image matches.

Color Moment Model

Color histogram and quantized color histogram techniques are known to be susceptible to errors. One source of error originates in changes in illumination that result in all of the colors in a second image being slightly different from the colors in a first, otherwise highly similar image. One approach to remediation of this is to form histograms of color ratios. However, it has been determined empirically that color ratio histograms do not result in significant improvement.

FIG. 7 is a flowchart describing a process 700 for computing moments of color data. Taking moments of color data provides a computationally tractable tool and results in compact feature vectors, and also improves the quality of matching based on feature vectors formed using color moment data.

The process 700 begins in a block 705. In the block 705, a first moment $E_i$ of the image colors is computed. The first moment $E_i$ is computed as the average of the image color distribution in each color channel and is computed as shown in Calc. (19) below:

$$E_i = (1/N)\left(\sum_{j=1}^{N} p_{ij}\right).$$  Calc. (19)

In a block 710, the process 700 computes a second moment $\sigma_i$ of the image colors. The second moment $\sigma_i$ is computed as the variance of the image color distribution in each color channel and is computed as shown in Calc. (20) below:

$$\sigma_i = sqrt((1/N)\left(\sum_{j=1}^{N}(p_{ij}-E_i)^2\right))$$  Calc. (20)

In a block 715, the process 700 computes a third moment $s_i$ of the image colors. The third moment $s_i$ is computed as the skewness of the image color distribution in each color channel and is computed as shown in Calc. (21) below:

$$s_i = ((1/N)\left(\sum_{j=1}^{N}(p_{ij}-E_i)^3\right))^{1/3}$$  Calc. (21)

Computing the average $E_i$, standard deviation $\sigma_i$ and the third root of the skewness $s_i$ as in Calcs. (19), (20) and (21) permits the results to have the same units.

In a block 720, the feature vector corresponding to the image is augmented with the color moment information. The process 700 then ends.

The color channels may be decoupled, at least partially, by use of HSV color space (discussed above with reference to the texture moment model). The color moment model can give rise to false positives but also allows very compact feature vectors to represent an image—in one example, nine floating point numbers are used to store the first three moments to represent an image. Typically, the hue values provide the most useful information for indexing and sorting.

Combining Multiple Models

Figure 8:
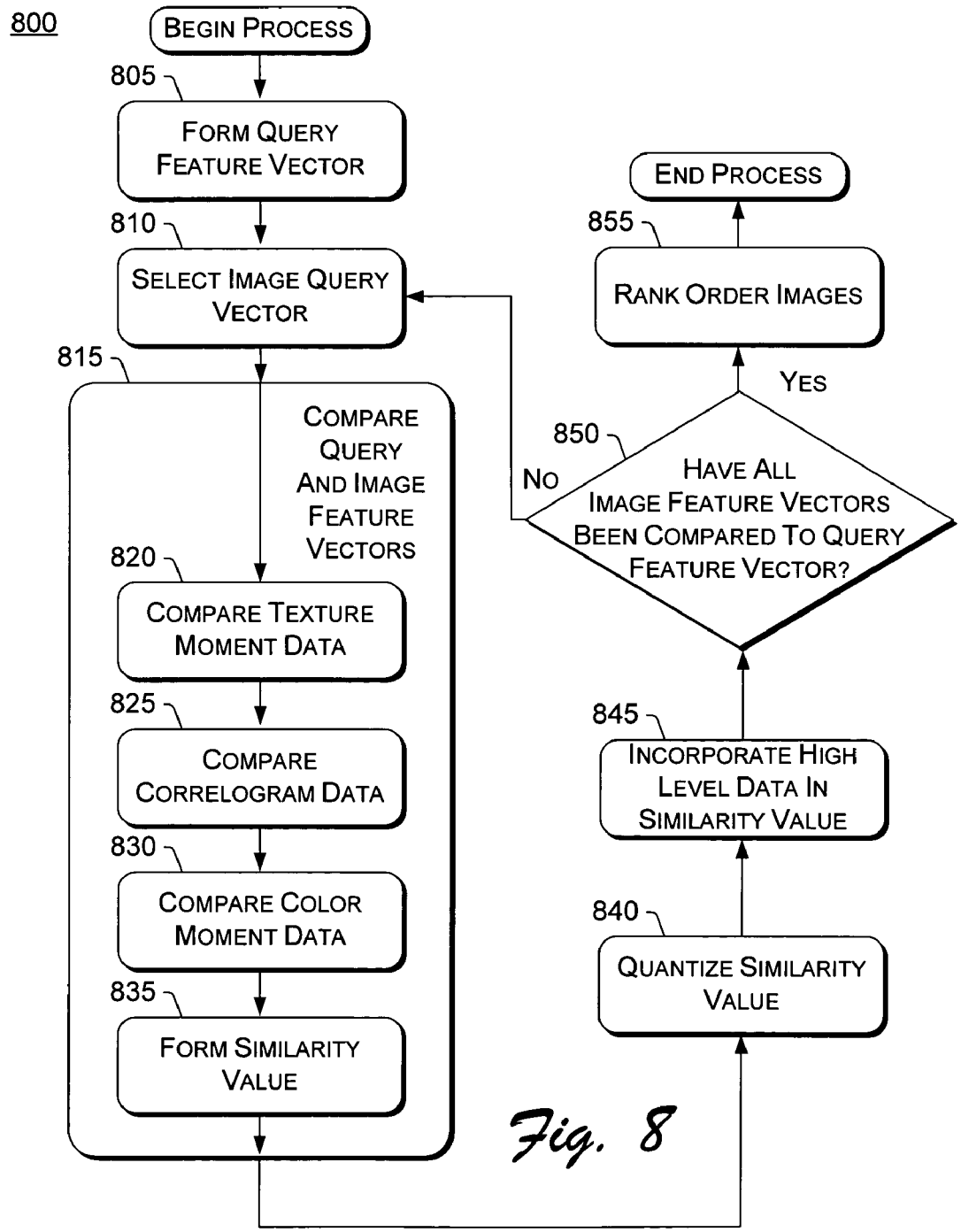
FIG. 8 is a flowchart describing a process for comparing images.

FIG. 8 is a flowchart describing a process 800 for comparing images. The process 800 begins in a block 805. In the block 805, a query feature vector is formed. The query feature vector may be formed by selecting a query image and extracting corresponding feature vector information.

In a block 810, an image feature vector corresponding to a stored image is selected. The image feature vector may be extracted from a database such as the database 112 of FIG. 1.

In a block 815, the query and image feature vectors are compared to determine similarity indices. The query and image feature vectors are compared in the block 815 to derive similarity indices corresponding to a first similarity index $S_{TM}$ (block 820) corresponding to the texture moment model discussed above with reference to FIGS. 3, 4 and 5, a second similarity index $S_{CC}$ (block 825) corresponding to the correlogram model discussed above with reference to FIG. 6 and a third similarity index $S_{CM}$ (block 830) corresponding to the color moment model discussed above with reference to FIG. 7.

In the block 820, texture moment data from the query and image feature vectors are compared for two images I and I' to provide the first similarity index $S_{TM}$. The comparison may be done as shown below with reference to Calc. (22):

$$S_{TM} = 1 - \left((1/r)\sum_{i=1}^{r} w_{i1}|TM(I_1)_{1,i} - TM(I_2)_{1,i}| + \right.$$
$$\left. w_{i2}|TM(I_1)_{2,i} - TM(I_2)_{2,i}|\right),$$
Calc. (22)

where r is an integer index variable, $w_{i1}$ and $w_{i2}$ are weights and TM(I) refers to texture moment feature vector data calculated as described above with reference to FIGS. 3, 4 and 5. It will be appreciated that other kinds of distance calculations may be employed to form the texture moment similarity index $S_{TM}$.

In the block 825, correlogram similarity data from the query and image feature vectors are compared for two images I and I' to provide the second similarity index $S_{CC}$. Distances $\alpha_1$ and $\alpha_2$, corresponding to correlogram similarity indices $S_{CC}$, between two images I and I' can be found by Calcs. (23), (24) and (25) below:

$$\alpha_1 = |I - I'|_{h,LI} \equiv \sum_{i \in [m]} |h_{ci}(I) - h_{ci}(I')|, \text{ and} \quad \text{Calc. (23)}$$

$$\alpha_2 = |I - I'|_{\gamma,LI} \equiv \sum_{i,j \in [m], k \in [d]} |\gamma_{ci,cj}^{(k)}(I) - \gamma_{ci,cj}^{(k)}(I')|. \quad \text{Calc. (24)}$$

$$S_{CC} = w_1(1 - (\alpha_1/(\alpha_1+\alpha_2))) + w_2(1 - (\alpha_2/(\alpha_1+\alpha_2))), \quad \text{Calc. (25)}$$

where $w_i$ are weights. It will be appreciated that other kinds of distance calculations may be employed to form the color correlogram similarity index $S_{CC}$.

In the block 830, color moment data from the query and image feature vectors are compared for two images I and I' to provide the third similarity index $S_{CM}$. The color moment feature vector values may be compared for two images I and I' having index entries for first moments of $E_i$ and $F_i$, respectively, for second moments of $\sigma_i$ and $\zeta_i$, respectively and third moments of $s_i$ and $t_i$, respectively, over r many color channels, to provide a color moment similarity index $S_{CM}$ by forming a weighted sum, e.g.:

$$S_{CM} = 1 - \left((1/r)\sum_{i=1}^{r} w_{i1}|E_i - F_i| + w_{i2}|\sigma_i - \zeta_i| + w_{i3}|s_i - t_i|\right). \quad \text{Calc. (26)}$$

It will be appreciated that other kinds of distance calculations may be employed to form the color moment similarity index $S_{CM}$.

In a block 835, a similarity value $S_V$ is computed from the similarity indices $S_{TM}$, $S_{CC}$ and $S_{CM}$ obtained in blocks 820, 825 and 830, respectively. A similarity value $S_V(I, I')$ is found by taking a weighted sum of the similarity indices found with the different models is formed as shown below by Calc. (27):

$$S_V(I, I') = w_1 * S_{TM}(I, I') + w_2 * S_{CC}(I, I') + w_3 * S_{CM}(I, I'), \quad \text{Calc. (27)}$$

where $w_1$, $w_2$ and $w_3$ are experimentally determined normalized weights that may differ or be changed based on the nature of the images being compared or sorted. The weights $w_1$, $w_2$ and $w_3$ may be normalized such that $0 \leq w_1, w_2, w_3 \leq 1$, and $w_1+w_2+w_3=1$, and the similarity values may have similar normalization. In some experiments, $w_1=50\%$, $w_2=30\%$ and $w_3=20\%$ provided robust and effective results. In some experiments, increasing $w_3$ resulted in increased false positives.

In a block 840, the similarity values $S_V$ are then quantized in accordance with a tiered ranking scheme to provide quantized similarity values $L_i$. In one embodiment, quantization is carried out to effectuate less than ten levels or tiers of quantization. In one embodiment, quantization is performed using an eight tier arrangement, according to Table II below, where 1.0 denotes the highest similarity and $1 > t_1 > \ldots > t_7 > 0$:

TABLE II

Exemplary quantization scheme.

| Quantized similarity value | Condition |
|---|---|
| $L_i = 1.0$, | when $S_v(I, I') > t_1$ |
| $L_i = 2.0$, | when $t_2 < S_v(I, I') \leq t_1$ |
| $L_i = 3.0$, | when $t_3 < S_v(I, I') \leq t_2$ |
| $L_i = 4.0$, | when $t_4 < S_v(I, I') \leq t_3$ |
| $L_i = 5.0$, | when $t_5 < S_v(I, I') \leq t_4$ |
| $L_i = 6.25$, | when $t_6 < S_v(I, I') \leq t_5$ |
| $L_i = 7.25$, | when $t_7 < S_v(I, I') \leq t_6$ |
| $L_i = 10.0$, | when $S_v(I, I') \leq t_7$ |

In a block 845, the quantized similarity values $L_i$ are adjusted in accordance with comparison of high-level features associated with each of the images I and I'. In one embodiment, the quantized similarity values $L_i$ are adjusted in accordance with high-level features such as indoor/outdoor classification, which may be performed automatically based on low-level features, face detection and/or time/date information with respect to image formation or information describing when the picture was taken (analogous to the keyword classification process described above). In one embodiment, indoor/outdoor classification is implemented using a classifier based on conventional AdaBoost classifier techniques, as described in "Boosting Image Orientation Detection with Indoor vs. Outdoor Classification", L. Zhang et al., 6th IEEE Workshop on Applications of Computer Vision (WACV 2002), December 2002.

A model for incorporating the indoor/outdoor classification information is given in Calc. (28) below, where f(x) represents the indoor/outdoor classification result.

$$P(y=+1|f(x)) = 1/((1+\exp(\alpha(Af(x)+B)), \quad \text{Calc. (28)}$$

where $\alpha$, A and B are empirically determined constants, for example, A=−1.04171 and B=0.697693. A value of $\alpha=\frac{1}{3}$ is used to avoid the distribution P being too sharp at 0 or 1.

When a difference in classification confidence of the two images is below a predefined threshold, the quantized similarity value is upgraded. For example, a confidence value between 0, corresponding to an outdoor picture, and 1, corresponding to an indoor picture, may be assigned to each image. When a difference between confidence values falls below a predetermined threshold $t_8$, such as 0.25, the quantized similarity value is upgraded by adding −0.25 to it.

When $|C(I)-C(I')| < t_8$, −0.25 is added to the quantized similarity value, where C represents a normalized confidence of the indoor/outdoor classification, $t_8$ is an experimentally determined threshold that may differ or be changed based on the nature of the images being compared or sorted. Comparison of two images to determine mutuality of presence or absence of one or more faces in two images are also high-level features that may be extracted from an image and used to determine similarity. For example, when both images contain more than one face, −0.5 is added to the quantized similarity value. When both images contain one face, −0.5 is added to the quantized similarity value.

The areas $A(I)$ and $A(I')$ within two images that are occupied by faces may also be compared, and are typically rather small. When $|A(I)-A(I')|<t_9$, the quantized similarity value is upgraded by adding $|0.5$, where A represents a ratio between facial area and image area, and $t_9$ is another predetermined threshold, for example, $t_9=0.01$.

In one embodiment, face detection is implemented using a classifier based on conventional AdaBoost classifier techniques, as described in "Robust Real-time Object Detection", P. Viola and M. Jones, Cambridge Research Laboratory Technical Report Series, February 2001, together with an AdaBoost training technique, as described, for example, in U.S. Patent Application No. 20020102024 A1, published on Aug. 1, 2002, and in "Robust Real-Time Object Detection", P. Viola and M. Jones, Cambridge Research Laboratories, Cambridge, Mass., CRL 2001/01, available at http://crl.research.compaq.com, which are hereby incorporated by reference herein for their teachings. These techniques rely on training of the shape or face recognition algorithm.

Differences $\Delta t$ in time/date of creation of an image may also correspond to likelihood of match, because images created at similar times are likely to relate to similar subjects, events or locations. For example, when I is very similar to I', e.g., when $L_i<4.0$, $L_i$ may be upgraded by adding −1.0 when $\Delta t \leq$ two hours; when $\Delta t <$ one day, $L_i$ may be upgraded by adding −0.5; when $\Delta t \leq$ one week, $L_i$ may be upgraded by adding −0.25.

In a query task 850, the process 800 determines whether all of the feature vectors in the database 112 have been compared to the query feature vector. When the query task 850 determines that not all of the feature vectors in the database 112 have been compared to the query feature vector, control passes back to block 810, and the process 800 iterates. When the query task 850 determines that all of the feature vectors in the database 112 have been compared to the query feature vector, control passes to a block 855.

In the block 855, images are rank ordered according to a degree of match or degree of similarity to the query feature vector. Images are considered to be similar when $L_i<6.0$ and may be classified into groups based on the adjusted quantized similarity value $L_i$. For example, the groups could be arranged into five groups A through E, ranging from most similar to least similar, as shown in Table III below:

TABLE III

Exemplary similarity groupings.

| Similarity group | Condition |
|---|---|
| A | when $L_i < 2.0$ |
| B | when $2.0 \leq L_i < 3.0$ |
| C | when $3.0 \leq L_i < 4.0$ |
| D | when $4.0 \leq L_i < 5.0$ |
| E | when $5.0 \leq L_i < 6.0$ |

This ranking allows the person who is seeking one or more images similar to a query image or vector to sort through the images, for example using the monitor 100 of FIG. 1, that were located by the processes 500, 600, 700 and 800 to efficiently review the results. The query may be revised in the event that none of the images correspond to a desired image.

The process 800 then ends. In some situations, such as those where images having many similar characteristics are processed, a particular combination of these processes or acts may be advantageously employed. In one embodiment, a user may program a device, such as a computer 902 (described below with reference to FIG. 9) or one or more processors contained in a camera 102 (FIG. 1) to employ a particular sequence of these acts.

The processes of FIGS. 5, 6, 7 and 8 may be implemented as one or more modules, such as hardware modules, or software modules. Such can comprise ASICs or processors coupled with one or more software modules.

Figure 9:
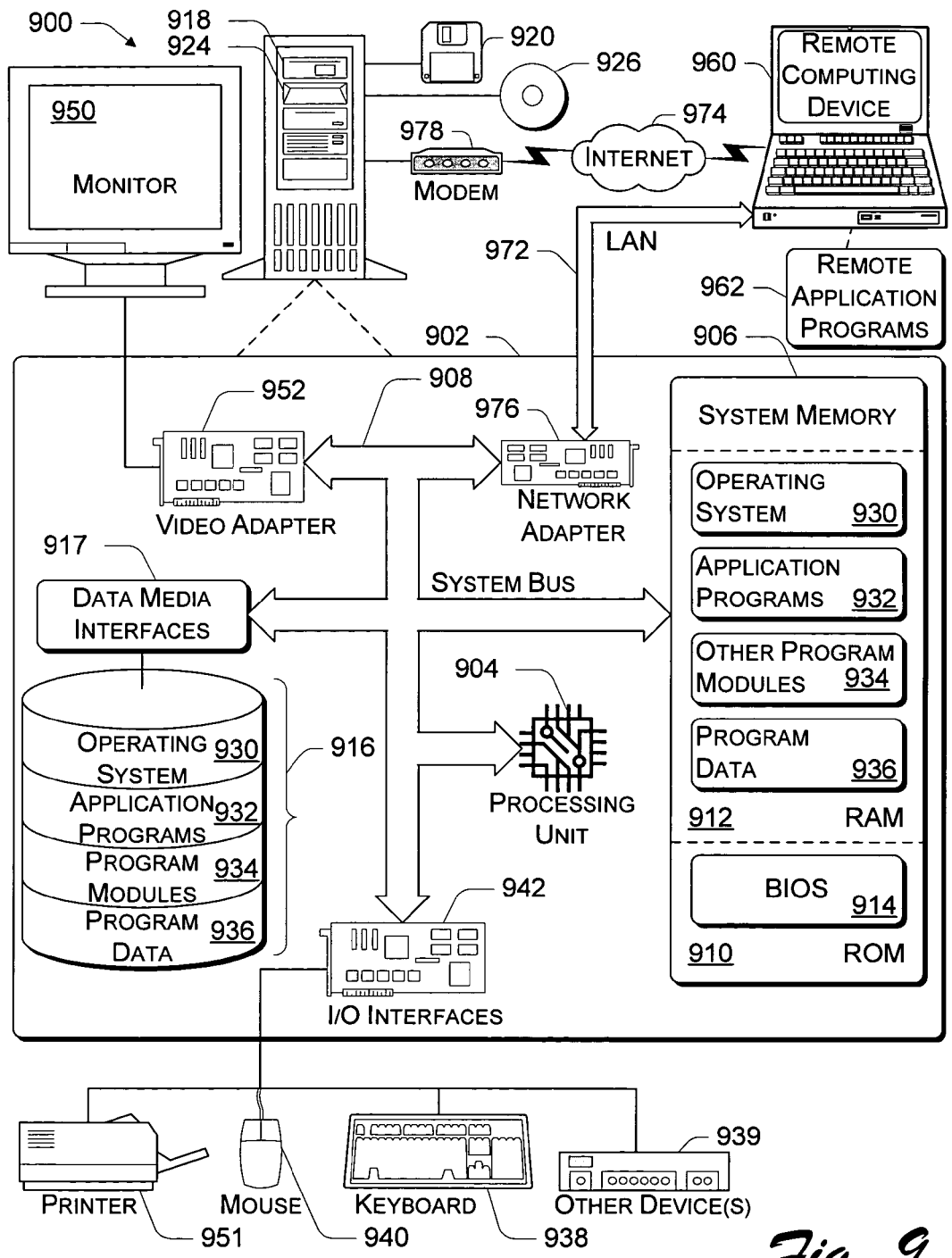
FIG. 9 illustrates an exemplary general computer environment.

FIG. 9 illustrates an example of a general computer environment 900. The illustrated operating environment is only one example of a suitable operating environment and is not intended to suggest any limitation as to the scope of use or functionality of the embodiments of this disclosure. Other well-known computing systems, environments, and/or configurations that may be suitable for implementation of the disclosure include, but are not limited to, personal computers, server computers, hand-held or laptop devices, multi-processor systems, microprocessor-based systems, programmable consumer electronics (e.g., digital video recorders), gaming consoles, cellular telephones, image capture devices (e.g., digital cameras), printers including data processing capabilities, network PCs, minicomputers, mainframe computers, distributed computing environments that include any of the above systems or devices, and the like.

FIG. 9 depicts a general example of a computer 902 that can be used to implement the processes described herein. The computer 902 is shown as an example of a computer in which various embodiments of these processes can be practiced, and can be, for example, the device 108 of FIG. 1, or a computer that is a portion of the camera 102. The computer 902 is illustrated as only an example of a computing device that may be used with the invention; other devices may alternatively used that include more components or alternatively fewer components than those illustrated in FIG. 9. For example, a digital camera may include only a processing unit, bus, system memory, universal serial bus interface, and removable storage device.

The computer 902 includes one or more processors or processing units 904, a system memory 906, and a bus 908 that couples various system components including the system memory 906 to processor(s) 904. The bus 908 represents one or more of any of several types of bus structures, including a memory bus or memory controller, a peripheral bus, an accelerated graphics port and a processor or local bus using any of a variety of bus architectures. The system memory 906 includes nonvolatile read only memory (ROM) 910 and random access memory (RAM) 912, which may or may not be a volatile memory. A basic input/output system (BIOS) 914, containing the basic routines that help to transfer information between elements within computer 902, such as during start-up, is stored in ROM 910.

The computer 902 further includes a hard disk drive 916 for reading from and writing to a hard disk, not shown, coupled to bus 908 via a data media interface 917 (e.g., a SCSI, ATA, or other type of interface); a magnetic disk drive 918 for reading from and writing to a removable magnetic disk 920 and an optical disk drive 924 for reading from and/or writing to a removable optical disk 926 such as a compact disc or CD, DVD, or other optical media. The hard disk drive 916, magnetic disk drive 918, and optical disk drive 924 are each coupled to the system bus 908 by one or more data media interfaces 917. Alternatively, the hard disk drive 916, magnetic disk drive 918, and optical disk drive 924 can be coupled to the system bus 908 by one or more interfaces (not shown).

The drives and their associated computer-readable media provide nonvolatile storage of computer readable instructions, data structures, program modules and other data for the computer 902.

Although the exemplary environment is described herein as employing a hard disk drive 916, a removable magnetic disk 920 and a removable optical disk 926, it will be appreciated by those skilled in the art that other types of computer readable media which can store data that is accessible by a computer, such as magnetic cassettes, flash memory cards, random access memories (RAMs), read only memories (ROM), and the like, may also be used in the exemplary operating environment.

A number of program modules may be stored on the hard disk drive 916, magnetic disk 920, optical disk 926, ROM 910, or RAM 912, including an operating system 930, one or more application programs 932, other program modules 934 and program data 936. A user may enter commands and information into computer 902 through input devices such as keyboard 938 and tactile input or pointing device 940. Other input devices 939 may include a microphone, joystick, game pad, satellite dish, scanner or the like. These and other input devices are coupled to the processing unit 904 through an input/output interface 942 that is coupled to the system bus (e.g., a serial port interface, a parallel port interface, a universal serial bus (USB) interface, an IEEE 1394 (Firewire) interface, etc.). A monitor 950 or other type of display device is also coupled to the system bus 908 via an interface, such as a video adapter 952. In addition to the monitor 950, personal computers such as the computer 902 typically include other peripheral output devices such as printer 953 and speakers (not shown).

The computer 902 operates in a networked environment using logical connections to one or more remote computers, such as a remote computer 960. The remote computer 960 may be another personal computer, a server, a router, a network PC, a peer device or other common network node, and typically includes many or all of the elements described above relative to the computer 902. In a networked environment, such as that illustrated with computing environment 900, program modules depicted relative to the computer 902, or portions thereof, may be stored in a remote memory storage device. By way of example, remote application programs 962 reside on a memory device of the remote computer 960. The logical connections represented in FIG. 9 include a local area network (LAN) 972 and a wide area network (WAN) 974.

Such networking environments are commonplace in offices and enterprise-wide computer networks, and in association with intranets and the Internet. In certain embodiments, the computer 902 executes an Internet Web browser program (which may optionally be integrated into the operating system 930) such as the "Internet Explorer" Web browser manufactured and distributed by Microsoft Corporation of Redmond, Wash.

When used in a LAN networking environment, the computer 902 is coupled to the local area network 972 through a network interface or adapter 976. When used in a WAN networking environment, the computer 902 typically includes a modem 978 or other means for establishing communications over the wide area network 974, such as the Internet. The modem 978, which may be internal or external, is coupled to the system bus 908 via a serial port interface. In a networked environment, program modules depicted relative to the personal computer 902, or portions thereof, may be stored in the remote memory storage device. It will be appreciated that the network connections shown are exemplary and other means of establishing a communications link between the computers may be used.

The computer 902 typically includes at least some form of computer readable media. Computer readable media can be any available media that can be accessed by the computer 902. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD, digital versatile disks (DVD) or other optical storage, magnetic cassettes, magnetic tape, magnetic disk storage or other magnetic storage devices, or any other media which can be used to store the desired information and which can be accessed by the computer 902. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The present disclosure is provided in part in the general context of computer-executable instructions, such as program modules, executed by one or more computers or other devices. Generally, program modules include routines, programs, objects, components, data structures etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) 904 of the computer 902.

Alternatively, the concepts disclosed herein may be implemented in hardware or a combination of hardware, software, and/or firmware. For example, one or more application specific integrated circuits (ASICs) could be designed or programmed to embody the concepts disclosed herein.

CONCLUSION

Although the description above uses language that is specific to structural features and/or methodological acts, it is to be understood that the recitation of the appended claims is not limited to the specific features or acts described. Rather, the specific features and acts are disclosed as exemplary forms of implementing these concepts.

What is claimed is:

1. A process implemented by a computing device for comparing two digital images, the process comprising:
   comparing texture moment data for the two images to provide a first similarity index;
   comparing color correlogram data for the two images to provide a second similarity index;
   comparing color moment data for the two images to provide a third similarity index;

combining the first, second and third similarity indices to provide a similarity value;

determining that the two images match when the similarity value exceeds a first threshold value; and responsive to determining that the two images match, providing an indication that the two images match.

2. The process of claim 1, wherein combining comprises forming a weighted sum from the first, second and third similarity indices.

3. The process of claim 1, further comprising determining that the two images do not match when the similarity value is less than a second threshold value.

4. The process of claim 1, wherein the two images comprise a first and a second image, the first of the two images comprises a query image, and further comprising locating one or more matches to a plurality of images in a database of images by iterating the acts of comparing color correlogram data, comparing color moment data, comparing texture moment data, combining and determining using as the second image a successive one image of the plurality of images.

5. The process of claim 1, further comprising:
comparing one or more high-level features from each of the two images; and
adjusting the similarity value in accordance with comparing one or more high-level features, prior to determining.

6. The process of claim 1, further comprising:
extracting one or more high-level features from each of the two images, wherein the one or more high-level features include a high-level feature chosen from a group consisting of: presence/absence of one or more human faces, indoor/outdoor scene and time/date of image formation;
comparing one or more of the high-level features from each of the two images; and
adjusting the similarity value in accordance with comparing one or more high-level features, prior to determining.

7. The process of claim 1, further comprising, after combining and before determining, adjusting the similarity value based on a calculation of commonality or lack of commonality between one or more high-level features associated with each of the two images and a confidence value thereof.

8. The process of claim 1, wherein at least one of the two images is a digital image taken using a digital camera.

9. The process of claim 1, wherein combining comprises:
weighting the first, second and third similarity indices by assigning the first similarity index a greatest weight and assigning the third similarity index a least weight; and
adding the weighted first, second and third similarity indices to provide an adjusted similarity value, wherein determining employs the adjusted similarity value in determining that the two images match.

10. The process of claim 1, further comprising quantizing the similarity value prior to determining, wherein quantizing comprises quantizing according to a tiered ranking scheme employing fewer than ten levels ranging from a lowest to a highest tier, with greater similarity values corresponding to higher tiers, wherein the first threshold value corresponds to a highest tier into which similarity values are quantized.

11. A process implemented by a computing device for manipulating image characterization data from a digital image, the process comprising:
indexing the digital image by extracting low-level feature data corresponding to a plurality of low-level features from the digital image, the plurality comprising two or more low-level features chosen from a group comprising texture moment data, color correlogram data, and color moment data;
organizing the data into a feature vector by;
(a) forming a query vector;
(b) if extracted low-level feature data corresponds to:
(i) texture moment data: comparing texture moment data for the query and feature vectors to provide a first similarity index;
(ii) color correlogram data: comparing color correlogram data for the query and feature vectors to provide a second similarity index; and
(iii) color moment data: comparing color moment data for the query and feature vectors to provide a third similarity index; and
(c) combining available ones of the first, second and third similarity indices to provide the feature vector;
utilizing the feature vector to identify a set of similar digital images; and
providing a result that identifies the set of similar images.

12. The process of claim 11, wherein indexing comprises:
first extracting texture moment data from the digital image;
second extracting color correlogram data from the digital image; and
third extracting color moment data from the digital image.

13. The process of claim 11, further comprising storing the feature vector in a database.

14. The process of claim 11, wherein organizing the data comprises forming a query vector, and further comprising:
obtaining a feature vector from a group of feature vectors corresponding to a plurality of digital images;
comparing the query vector to the feature vector to provide a similarity value;
determining when the similarity value exceeds a first threshold; and
iterating obtaining, comparing and determining for each feature vector of the group.

15. A computer-readable storage medium having embedded there on computer-program instructions for comparing two digital images, the computer-program instructions, when executed by a processor, for performing operations comprising:
comparing texture moment data for the two images to provide a similarity index, the similarity index being a first similarity index;
comparing color correlogram data for the two images to provide a second similarity index;
comparing color moment data for the two images to provide a third similarity index;
combining the first similarity index with other data to provide a similarity value, the other data comprising the second and the third similarity indices;
determining a degree to which the two images match when the similarity value exceeds a first threshold value; and
responsive to determining the degree to which the two images match, providing a result that indicates whether the two images match.

16. The computer-readable storage medium of claim 15, wherein combining comprises forming a weighted sum from the similarity index and other data.

17. The computer-readable storage medium of claim 15, further comprising determining that the two images do not match when the similarity value is less than a second threshold value.

18. The computer-readable storage medium of claim 15, wherein the two images comprise a first and a second image, the first of the two images comprises a query image, and further comprising locating one or more matches to a plurality of images in a database of images by iterating the acts of comparing, combining and determining using as the second image a successive one image taken from the plurality of images.

19. The computer-readable storage medium of claim 15, further comprising:
comparing one or more high-level features from each of the two images; and
adjusting the similarity value in accordance with comparing one or more high-level features, prior to determining.

20. The computer-readable storage medium of claim 15, further comprising:
extracting one or more high-level features from each of the two images, wherein the one or more high-level features include a high-level feature chosen from a group consisting of: presence/absence of one or more human faces, indoor/outdoor scene and time/date of image formation;
comparing one or more high-level features from each of the two images; and
adjusting the similarity value in accordance with comparing one or more high-level features, prior to determining.

21. The computer-readable storage medium of claim 15, further comprising, after combining and before determining, adjusting the similarity value based on a calculation of commonality or lack of commonality between one or more high-level features associated with each of the two images and a confidence value thereof.

22. The computer-readable storage medium of claim 15, wherein at least one of the two images is a digital image taken using a digital camera.

23. The computer-readable storage medium of claim 15, wherein combining the first similarity index with the other data further comprises:
weighting the first, second and third similarity indices by assigning the first similarity index a greatest weight and assigning the third similarity index a least weight; and
adding the weighted first, second and third similarity indices to provide an adjusted similarity value, wherein determining employs the adjusted similarity value in determining that the two images match when the similarity value exceeds the first threshold value.

24. The computer-readable storage medium of claim 15, further comprising quantizing the similarity value according to a tiered ranking scheme employing fewer than ten levels ranging from a lowest to a highest tier, with greater similarity values corresponding to higher tiers, wherein the first threshold value corresponds to a highest tier into which similarity values are quantized.

25. A camera comprising:
an image capture device configured to capture digital images;
a memory coupled to the image capture device and configured to store a database of image data, including the digital images and associated feature vectors each comprising texture moment data, correlogram data and color moment data; and
an image similarity module coupled to the memory and configured to:
generate a query vector comprising texture moment data, correlogram data and color moment data;
compare, in succession, the query vector to each feature vector in the database, to generate a similarity value;
classify each feature vector to assign each feature vector to a tier in a tiered similarity structure based on the associated similarity value;
group images associated with the respective feature vectors in each tier of the similarity structure to generate group(s) of similar images; and
provide the group(s) of similar images for sorting.

26. The camera of claim 25, wherein the image similarity module is further configured to:
adjust each similarity value in conformance with comparison of high-level data corresponding to the query vector and high-level data corresponding to each feature vector to provide an adjusted similarity value corresponding to each feature vector; and
use the adjusted similarity value to classify each feature vector in the tiered similarity structure.

27. The camera of claim 25, wherein the image similarity module is further configured to adjust each similarity value in conformance with comparison of high-level data corresponding to the query vector and high-level data corresponding to each feature vector to provide an adjusted similarity value corresponding to each feature vector, wherein high-level
data comprises: presence/absence of one or more human faces; indoor/outdoor scene; and time of image formation.

28. The camera of claim 25, wherein the image similarity module is further configured to:
adjust each similarity value in conformance with comparison of high-level data corresponding to the query vector and high-level data corresponding to each feature vector to provide an adjusted similarity value corresponding to each feature vector, wherein high-level data comprises: presence/absence of one or more human faces, indoor/outdoor scene and time/date of image formation; and
use the adjusted similarity value to classify each feature vector in the tiered similarity structure.

29. The camera of claim 25, further comprising a monitor configured to facilitate viewing of digital images stored in the database, wherein the digital images are accessed via associated feature vectors selected within a tier of the tiered similarity structure.

30. A computer readable storage medium having embedded thereon a plurality of computer-program instructions, the computer-program instructions, when executed by one or more processors, for performing operations comprising:
successively comparing a query vector to each feature vector in a database, the query vector and the feature vectors each including texture moment data, correlogram data and color moment data;
successively compare texture moment data from the query vector to texture moment data from each feature vector to provide a first similarity index;
successively compare correlogram data from the query vector to correlogram data from each feature vector to provide a second similarity index;
successively compare color moment data from the query vector to color moment data from each feature vector to provide a third similarity index; and
form a similarity value as a weighted sum of the first, second and third similarity indices for each feature vector, wherein the plurality of instructions that cause the one or more processors to rank comprise instructions that cause the one or more processors to quantize similarity values into ranked tiers based in part on high-level features associated with the query vector and the feature vectors, each tier corresponding to a different degree of similarity between the query vector and the feature vectors associated with that tier;

ranking each feature vector into a tier of a tiered classification scheme based on the comparison between the feature vector and the query vector; and utilizing the tiered classification scheme to provide an indication whether first and second digital images have matching similarities.

31. A system for image correlation comprising:

one or more processors;

a memory coupled to the one or more processors, the memory comprising computer-program instructions executable by the one or more processors to store a database representing digital images, the computer-program instructions comprising;

an image comparison module configured to (a) cause the one or more processors to access the data representing the images and to select one or more feature vectors each associated with a corresponding image based on comparison of color texture data and other data contained in each feature vector with analogous data contained in a query feature vector; and (b) compare correlogram data and color moment data contained in each feature vector with analogous data contained in the query feature vector; and (c) select the one or more feature vectors based on a weighted sum of similarity indices respectively derived from comparing the color texture moments, the correlogram data and the color moment data; and a display device coupled to the one or more processors and to the memory and configured to display digital images corresponding to the selected one or more feature vectors in response to user input, the digital images having been determined to share a set of similarity characteristics.

32. The system of claim 31, wherein the other data include high-level feature data.

33. The system of claim 31, wherein the image comparison module further is configured to cause the one or more processors to:

extract one or more high-level features contained in each feature vector and analogous data contained in the query feature vector, wherein the one or more high-level features include a high-level feature chosen from a group consisting of: presence/absence of one or more human faces; indoor/outdoor scene; and time of image formation;

compare one or more of the high-level features from each feature vector and analogous data contained in the query feature vector; and employ results from comparing the one or more high-level features in selecting the one or more feature vectors.

* * * * *